United States Patent [19]

Yoshida

[11] Patent Number: 4,662,907
[45] Date of Patent: May 5, 1987

[54] APPARATUS FOR REMOVING HUMIDITY FROM COMPRESSED AIR

[75] Inventor: Masahiko Yoshida, Hamamatsu, Japan

[73] Assignee: Sanai Co., Ltd., Japan

[21] Appl. No.: 836,073

[22] Filed: Mar. 4, 1986

[30] Foreign Application Priority Data

Jul. 9, 1985 [JP] Japan .............. 60-104395[U]

[51] Int. Cl.$^4$ ............................................. B01D 29/04
[52] U.S. Cl. ........................................ 55/186; 55/320; 55/497; 55/DIG. 17
[58] Field of Search .................. 55/320–323, 55/325, 185, 186, 350, 485, 486, DIG. 17, 497, 521, 525

[56] References Cited

U.S. PATENT DOCUMENTS 2,467,408  4/1949  Semon ............................. 55/325
4,015,959  4/1977  Grote ............................. 55/486 X

FOREIGN PATENT DOCUMENTS 1068221  11/1959  Fed. Rep. of Germany ........ 55/320

Primary Examiner—Charles Hart
Attorney, Agent, or Firm—Lalos, Keegan & Kaye

[57] ABSTRACT

A small-size, handling-convenient apparatus for removing humidity from compressed air. According to the present apparatus compressed air is cooled without using a cooling device, and the water content and oil content in the compressed air is captured for removal by a stainless net instead of a porous filtering material.

1 Claim, 6 Drawing Figures

APPARATUS FOR REMOVING HUMIDITY FROM COMPRESSED AIR

BACKGROUND OF THE INVENTION

According to conventional systems, compressed air is first cooled by means of a cooling device and then passed through a porous filter medium to remove water content, oil content and other dust or foreign particles in the compressed air from a compressor. In the drawbacks of such conventional systems the removing apparatus was large-sized and expensive, and the porous filter medium is blocked in a short period of time so that it had to be replaced.

SUMMARY OF THE INVENTION

This invention relates to an apparatus for removing humidity from compressed air for removing water content, oil content and the like in compressed air.

The object of the invention is to provide a small-size, handling-convenient apparatus for removing humidity from compressed air, in which the compressed air is cooled without using a cooling device, and the water content, the oil content and the like in the compressed air is captured for removal by means of a stainless net instead of a porous filter medium.

The present apparatus for removing humidity from compressed air is characterized in that an inner cylinder is concentrically provided within an outer cylinder where the cover body is provided with an inlet opening and an outlet opening of air and the bottom is provided with a drain exhaust port, a plug body which is screwed with a female screw mounted in the upper inner periphery of said inner cylinder is tightly fixed to the lower surface of said cover body, the air entered from said air inlet opening into a cavity provided in the plug body is ejected from an ejection opening bored in the cavity wall toward a female screw in the inner periphery of the inner cylinder, the water content, the oil content and the like are captured in the captureing portion of a stainless net arranged in said inner cylinder while the air is oriented by the female screw and descends swirling within said inner cylinder, the clean air discharged from the lower end of the inner cylinder descends while swirling between the inner cylinder and the outer cylinder thereby to be discharged from the air outlet opening, and the water content and/or the oil content thus removed are taken out from a drain exhaust port.

DESCRIPTION OF THE PREFERRED EMBODIMENT

Figure 1:
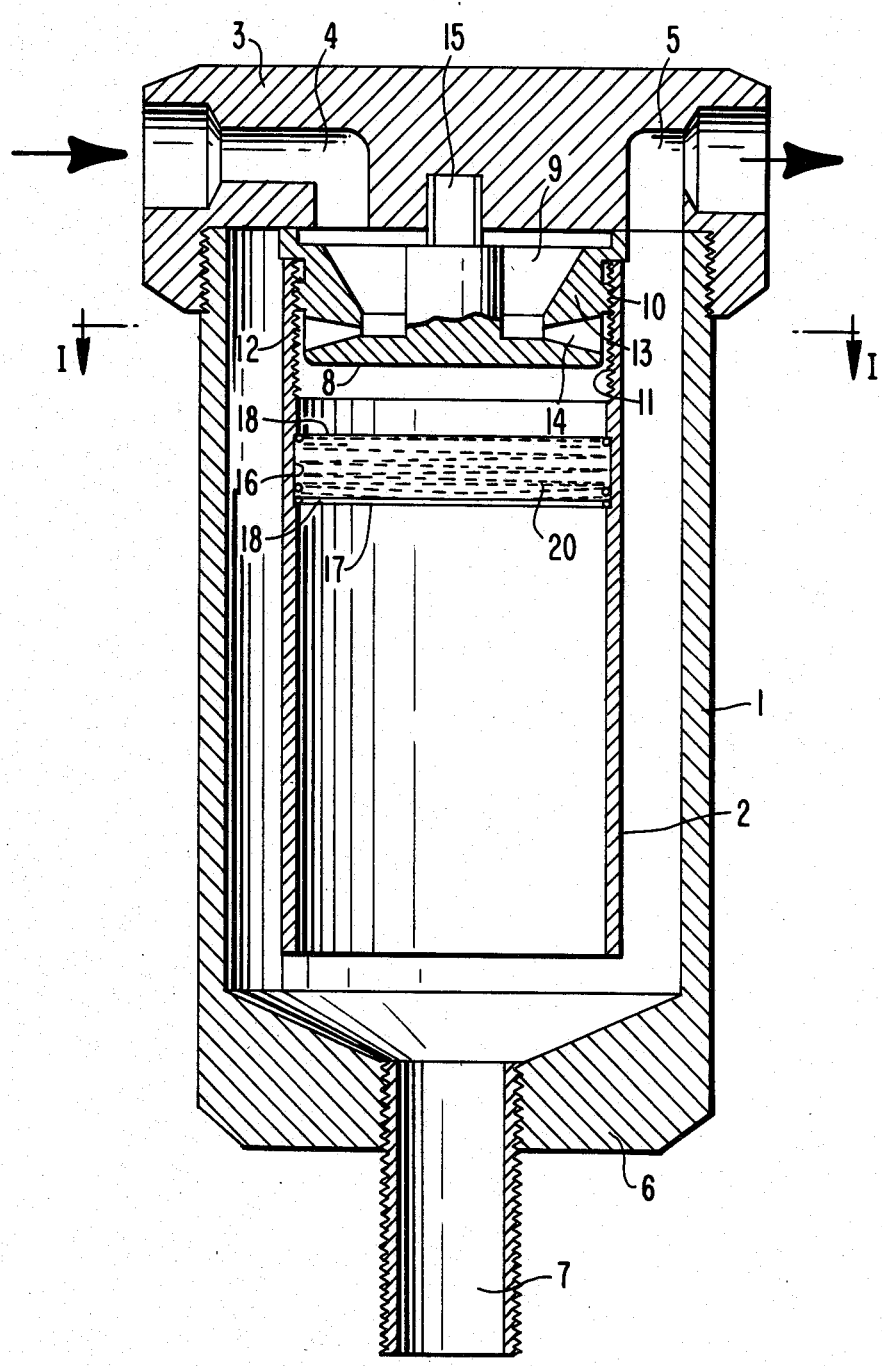
FIG. 1 is a vertical sectional view of the present apparatus for removing humidity from compressed air.
Figure 2:
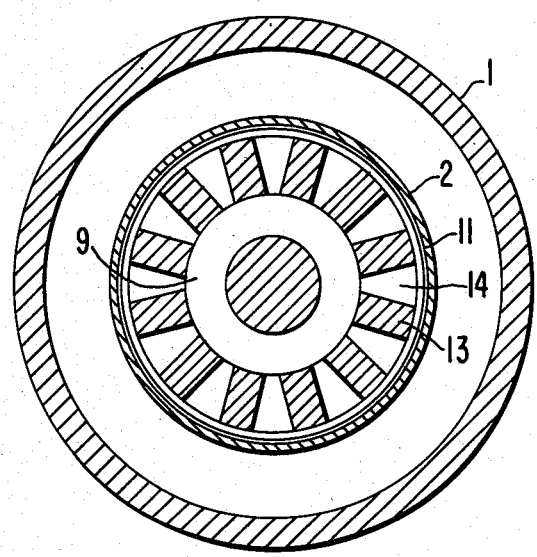
FIG. 2 is a sectional view taken along the line I—I of FIG. 1.

The invention will now be described more in detail, by way of embodiment, with reference to the accompanying drawings.

A cover body 3 of an outer cylinder 1 is provided with an air inlet 4 opening near the axial center line of the outer cylinder 1 and an air outlet 5 opening near the wall of the outer cylinder, and the bottom 6 of the outer cylinder is provided with a drain exhaust port 7. A plug body 8 of an inner cylinder 2 is secured tightly to the lower surface of the cover body 3, a conical cavity 9 concentric with the plug body 8 is arranged on the upper surface of the plug body 8, and a male screw 10 is provided at the outer peripheral center of the plug body 8. Said male screw 10 engages with a female screw 11 of the inner periphery of the inner cylinder, and it is constructed in such a manner that a clearance 12 in the range of about 0.5–1.00 mm may be formed between the outer periphery below the male screw 10 of the outer periphery of said plug body 8 and the female screw 11. 4 to 24 air exhaust ports 14 are radially arranged in the wall 13 near the bottom of said cavity 9, said air exhaust ports being tapered openings, the diameters of which are 1–3 mm in the inlet and increase up to 6 mm in the outlet. The plug body 8 is screwed to the lower face of the cover body 3 at a bolt portion 15 projected at the center of the plug body 8, the air inlet hole 4 opens at the closed cavity 9, and the compressed air once enters into the cavity 9 and it is ejected from a numer of air exhaust ports 14 toward the female screw 11. Further, the inner circumference of said inner cylinder 2 is provided with a shallow but wide peripheral groove 16 at a position lower than the female screw 11 thereby to fix three capturing bodies made of a stainless net to catch the water content and/or the oil content in the compressed air.

Figure 4:
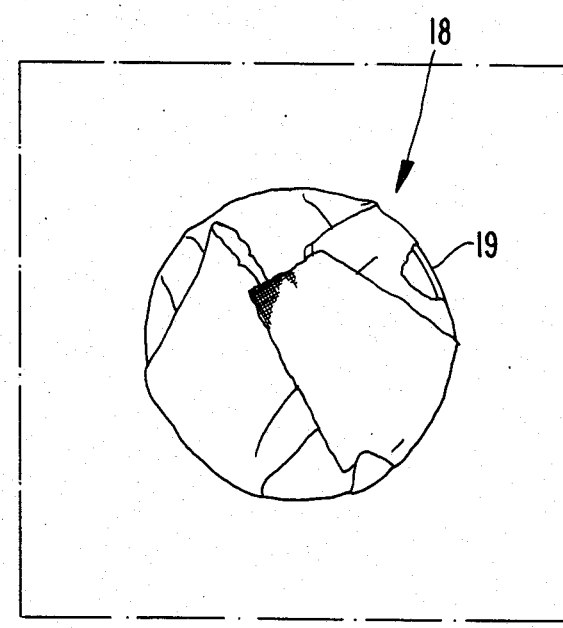
FIG. 4 is a rear view of a dish-shape capturing body.
Figure 3:
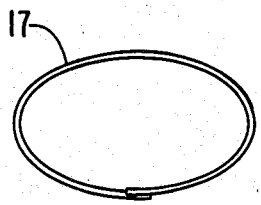
FIG. 3 is a perspective view of a ring.
Figure 5:
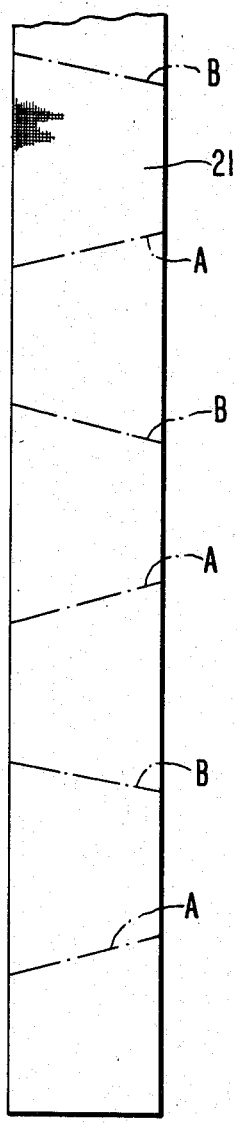
FIG. 5 is a front view, partly broken, of a band of stainless net before the net is inserted into the inner cylinder.
Figure 6:
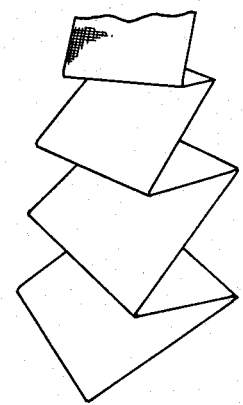
FIG. 6 is a perspective view showing a state in which said band is bent zigzag.

Reference 17 designates a steel wire ring (ring which is made not by connecting both the ends of a stainless steel wire) which is axially resilient, and reference 18 designates dish-shape capturing bodies in which a ring 19 similar to said ring 17 is prepared in such a way that the circumferential portion of the ring 19 is turned inside out along the ring 19 so that said ring 19 may be enclosed by stainless net as shown with a two-dot chain line of FIG. 4. Reference 20 shows a capturing body bent zigzag as shown in FIG. 6, in such a way that as shown in FIG. 5 a band 21 of stainless net, which has a width smaller a little than the diameter of the inner cylinder 2 is bent inwardly with one-dot chain lines A and outwardly with two-dot chain lines B. Additionally, all said stainless nets are of fine meshes of about 250. These capturing bodies are housed from the upper opening of the inner cylinder 2 before the plug body 8 is screwed with the inner cylinder 2. Firstly the ring 17 is inserted into the lowermost portion of the peripheral groove 16 where it is secured with resilient force, secondly the dish-shape capturing bodies 18 are inserted and they are secured with the resilient force of the ring 19, thirdly the zigzag capturing bodies 20 are inserted, and finally again the dish-shape capturing bodies 18 are inserted to be fixed with the resilient force of the ring 19.

FUNCTIONS OF THE INVENTION

Then the functions of the present apparatus for removing humidity from compressed air will be described. The compressed air from an air compressor enters from the air inlet opening 4 into the caivity 9, and then it is ejected from the air exhaust ports 14 when the air impinges against the female screw 11. In the compressed air, the temperature of which has now been lowered, the water content and/or the oil content are caught by means of the dish-shape capturing bodies 18 and the zigzag capturing bodies 20 while the compressed air descends while swirling being oriented by the female screw 11. The cleaned compressed air passes through between the inner cylinder and the outer cylinder to reach a pipe or hose from the air outlet opening 5, when the water content and the oil content are removed from the drain exhaust port.

According to the apparatus of the present invention for removing humidity from compressed air, the apparatus can be made simple in construction and small-sized in shape and it is possible to efficiently remove humidity of compressed air without any trouble for maintenance.

What is claimed is:

1. An apparatus for removing humidity from compressed air of the type in which the apparatus is provided with an inner cylinder and an outer cylinder and the water content and/or the oil content are removed while the compressed air descends within the inner cylinder, comprising the steps of:

providing at a cover body 3 of an outer cylinder 1 an air inlet opening 4 opening near the axial center line of the outer cylinder 1 and an air outlet opening 5 opening near the wall of the outer cylinder 1;

screwing a male screw 10 arranged at the outer peripheral center of a plug body 8 with a female screw 11 arranged at the upper inner periphery of an inner cylinder 2;

forming a clearance 12 between the outer periphery below the male screw 10 of the outer periphery of said plug body 8;

providing at the upper surface of said plug body 8 a conical cavity 9 concentric with said plug body;

providing radially at a wall 13 near the bottom of said cavity 9 a number of tapered air exhaust ports 14;

providing a shallow but wide peripheral groove 16 in the inner circumference of said inner cylinder 2; and inserting, in order from the below to the above, into said peripheral groove 16, a steel ring wire 17, dish-shape capturing bodies 18 which are made by enclosing a steel wire ring 19 with a stainless net, a zigzag capuring body 20 which is made by bending a band of a stainless net zigzag, and dish-shape capturing bodies which are made by enclosing a steel wire ring with a stainless net.

* * * * *